US007106039B1

(12) United States Patent
Scott et al.

(10) Patent No.: US 7,106,039 B1
(45) Date of Patent: Sep. 12, 2006

(54) CLOSED LOOP DIRECT CURRENT TO DIRECT CURRENT CONVERTER THAT DOES NOT REQUIRE VOLTAGE REFERENCE

(75) Inventors: Greg Scott, Inkom, ID (US); Joseph Walsh, Pocatello, ID (US)

(73) Assignee: AMI Semiconductor, Inc., Pocatello, ID (US)

( * ) Notice: Subject to any disclaimer, the term of this patent is extended or adjusted under 35 U.S.C. 154(b) by 0 days.

(21) Appl. No.: 11/119,452

(22) Filed: Apr. 29, 2005

(51) Int. Cl.
*G05F 5/00* (2006.01)
*G05F 1/40* (2006.01)
(52) U.S. Cl. .................. 323/303; 323/285; 323/283
(58) Field of Classification Search ................ 323/299, 323/303, 273, 275, 283, 285
See application file for complete search history.

(56) References Cited

U.S. PATENT DOCUMENTS 5,815,380 A * 9/1998 Cuk et al. ................... 363/16
5,912,552 A   6/1999 Tateishi ....................... 323/285
7,023,710 B1* 4/2006 Durbaum et al. ............. 363/19
7,038,514 B1* 5/2006 Leith et al. .................. 327/198

* cited by examiner

*Primary Examiner*—Bao Q. Vu
(74) *Attorney, Agent, or Firm*—Workman Nydegger

(57) ABSTRACT

A closed loop DC-to-DC converter circuit that includes an open loop DC-to-DC converter circuit configured to provide charge on its output terminal. A voltage-controlled inverse-resistance component is coupled to the output terminal of the open loop DC-to-DC converter circuit, such that the greater the voltage differential across the component, the lower the resistance provided by the component. A feedback system provides a signal to a control terminal of the open-loop DC-to-DC converter circuit that is dependent on the current provided through the voltage-controlled inverse-resistance component. Specifically, the signal provided by the feedback system causes the open loop DC-to-DC converter circuit to generate more current on the output terminal when there is less current passing through the voltage-controlled inverse-resistance component, and less or no current on the output terminal when there is more current passing through the voltage-controlled inverse-resistance component.

22 Claims, 2 Drawing Sheets

US 7,106,039 B1

CLOSED LOOP DIRECT CURRENT TO DIRECT CURRENT CONVERTER THAT DOES NOT REQUIRE VOLTAGE REFERENCE

BACKGROUND OF THE INVENTION

1. The Field of the Invention

The present invention relates generally to electronic circuitry and, more particularly, to closed loop Direct Current (DC) to DC current converters.

2. Background and Relevant Art

Many typical integrated semiconductor devices operate using standard supply voltages that are set to promote reliability and performance for a given technology. For example, semiconductor circuits typically have access to a relatively low supply voltage (often referred to as VSS) and to a relatively high supply voltage (often referred to as VDD). However, it is often advantageous to provide even higher supply voltages for high voltage devices. For example, a high voltage transistor may be added to the standard Complementary Metal-Oxide-Semiconductor (CMOS) process to allow for switching of higher voltages than the standard technology is designed to handle. As an additional example, embedded Electronically Erasable and Programmable Read-Only-Memory (EEPROM) may be added to the standard CMOS technology. EEPROMs typically use higher voltages to program and erase than provided by the standard technology.

Direct Current (DC) to Direct Current (DC) converters (also referred to herein as "DC-to-DC converters") up-convert the supply voltages when higher voltages are needed. There are several conventional DC-to-DC converter types, most of which have high output impedances. Therefore, DC-to-DC converters are typically designed to generate a higher voltage than needed. The output DC voltage of the DC-to-DC converter is thus regulated to a desired voltage by a feedback system. An example of such a DC-to-DC converter is illustrated in FIG. 2 as closed loop DC-to-DC converter 200.

The closed loop DC-to-DC converter 200 includes an open loop DC-to-DC converter 210, an output capacitor 220, and a feedback system 230. The open loop DC-to-DC converter 210 is capable of using the standard high voltage reference VDD to generate an even higher output voltage $V_{out}$ on its output terminal OUT. If the open loop DC-to-DC converter 210 is operating at maximum power continuously, then its output voltage $V_{out}$ will be higher than needed. The feedback system 230 enables and disables the open loop DC-to-DC converter 210 as appropriate so that the output voltage $V_{out}$ is regulated about its desired value.

The feedback system 230 includes a series of two resistors 231 and 232 and a comparator 233. The two resistors 231 and 232 are configured in series between the output terminal OUT and ground so as to voltage divide the output voltage $V_{out}$. The negative input terminal of the comparator 233 receives the voltage divided voltage from between the resistors 231 and 232. The positive input terminal of the comparator 233 receives a reference voltage $V_{ref}$. If the output voltage $V_{out}$ is below its desired value, then the reference voltage $V_{ref}$ is greater than the voltage divided voltage. In that case, the comparator 233 enables (or causes to remain enabled) the open loop DC-to-DC converter 210 thereby increasing the output voltage $V_{out}$. If the output voltage $V_{out}$ is above its desired value, then the voltage divided voltage is greater than the reference voltage $V_{ref}$. In that case, the comparator 233 disables (or causes to remain disabled) the open loop DC-to-DC converter 210 thereby decreasing the output voltage $V_{out}$ as charge drains through the resistors 231 and 232.

The closed loop DC-to-DC converter 200 requires a reference voltage $V_{ref}$, which requires additional power and additional layout area on the integrated chips. Furthermore, the resistors 231 and 232 places a load on the DC-to-DC converter 200 since, as previously mentioned, current drains through the resistors 231 and 232 regardless of the output voltage $V_{out}$ level. DC-to-DC converters typically have low power efficiencies so the current drain on the high supply voltage $V_{out}$ will be several times greater than the current drain through the resistors 231 and 232.

Accordingly, what would be advantageous would be a DC-to-DC converter that has a regulated closed loop feedback system that does not require a reference voltage and that reduced the load on the output of the DC-to-DC converter.

BRIEF SUMMARY OF THE INVENTION

The foregoing problems with the prior state of the art are overcome by the principles of the present invention, which relate to a closed loop DC-to-DC converter circuit that includes an open loop DC-to-DC converter circuit configured to provide charge on its output terminal. A voltage-controlled inverse-resistance component (also referred to as a "variable resistance component") is coupled between the output terminal of the open loop DC-to-DC converter circuit and a low voltage node, such that the greater the voltage differential across the component, the lower the resistance provided by the component. The feedback system provides a signal to a control terminal of the open-loop DC-to-DC converter circuit that is dependent on the current provided through the variable resistance component. Specifically, the signal provided by the feedback system causes the open loop DC-to-DC converter circuit to generate more current on the output terminal when there is less current passing through the variable resistance component, and less or no current on the output terminal when there is more current passing through the variable resistance component.

Accordingly, the output voltage is regulated by the feedback system without the need for a space consuming reference voltage circuitry. Furthermore, significant current is only drawn from the output terminal when the voltage exceeds where it should be, rather than all the time, thereby reducing power consumption.

The feedback system may be a digital feedback system in which case the control terminal is an enable terminal. The digital feedback system provides a signal representing one binary state if the current passing through the variable resistance component is greater than a threshold value, and representing the opposite binary state if the current passing through the variable resistance component is less than the threshold value. Accordingly, the open loop DC-to-DC converter circuit is turned on and off as appropriate to regulate its output voltage.

The feedback system may also be an analog feedback system in which case the control terminal is an analog input terminal. The analog feedback system provides an analog signal to an analog input terminal of the open loop DC-to-DC converter circuit that is a function of the current passing through the variable resistance component such that the output voltage is regulated.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to a closed loop DC-to-DC converter circuit that includes an open loop DC-to-DC converter circuit configured to provide charge on its output terminal. A voltage-controlled inverse-resistance component (also referred to as a "variable resistance component") is coupled between the output terminal of the open loop DC-to-DC converter circuit and a low voltage node, such that the greater the voltage differential across the component, the lower the resistance provided by the component. A feedback system provides a signal to a control terminal of the open-loop DC-to-DC converter circuit that is dependent on the current provided through the variable resistance component. Specifically, the signal provided by the feedback system causes the open loop DC-to-DC converter circuit to generate more current on the output terminal when there is lower current passing through the variable resistance component, and less or no current on the output terminal when there is higher current passing through the variable resistance component. Accordingly, the output voltage is regulated by the feedback system without the need for space consuming reference voltage circuitry. Furthermore, significant current is only drawn from the output terminal when the voltage exceeds where it should be, rather than all the time, thereby reducing power consumption.

Figure 1A:
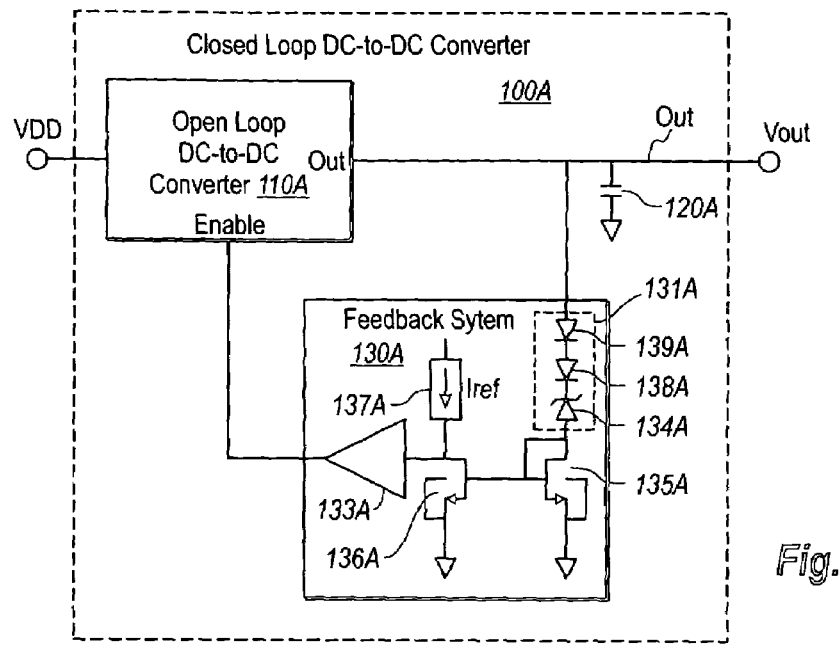
FIG. 1A is a circuit diagram of a closed loop DC-to-DC converter circuit in accordance with a first embodiment of the present invention in which the feedback system is digital.
Figure 1B:
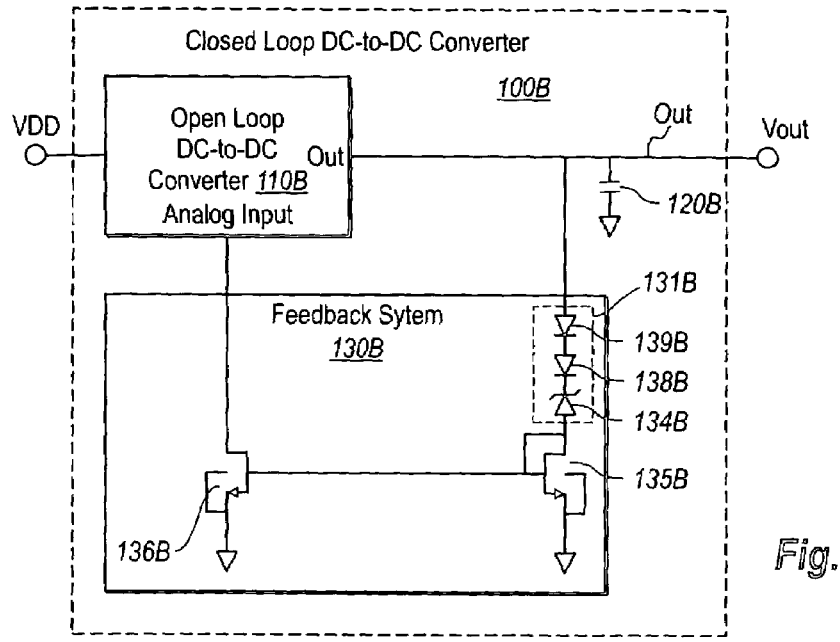
FIG. 1B is a circuit diagram of a closed loop DC-to-DC converter circuit in accordance with a second embodiment of the present invention in which the feedback system is analog.

FIGS. 1A and 1B illustrated closed-loop DC-to-DC converter circuits 100A and 100B (collectively referred to also as "closed-loop DC-to-DC converter circuits 100"). FIG. 1A will be described first and includes a closed-loop DC-to-DC converter circuit 100A that has a digital feedback system 130A.

Figure 2:
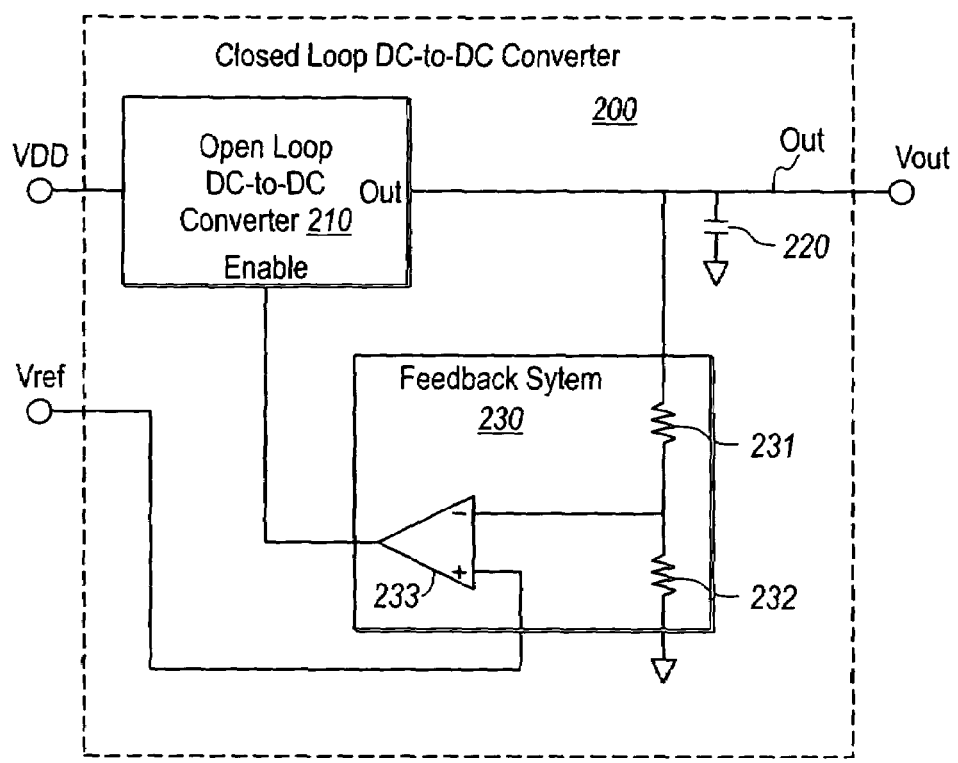
FIG. 2 is a circuit diagram of a closed loop DC-to-DC converter circuit in accordance with the prior art.

Specifically, the closed-loop DC-to-DC converter circuit 100A includes an open-loop DC-to-DC converter circuit 110A and, if needed to supply sufficient output capacitance, an output capacitor 120A. These components may, but need not be, similar to the open loop DC-to-DC converter 210 and output capacitor 220 described above with respect to FIG. 2.

The digital feedback system 130A consists of a voltage-controlled inverse-resistance component 131A coupled between the output terminal OUT and a low voltage node such as, for example, a grounded node. In this description and in the claims, a "voltage-controlled inverse-resistance component" when coupled between an output terminal and a low voltage node is defined as any circuit component in which the resistance of the component is less when the output terminal is at or above the desired voltage than when the output terminal is below the desired voltage. In order to provide desirable power efficiency, in one embodiment, the resistance of the component when the output terminal is at or above the desired voltage may be at least twice or even one or more orders of magnitude less than when the output terminal has a voltage that is equal to the voltage at the low voltage node.

FIG. 1A illustrates one particular embodiment of such a voltage-controlled resistance component 131A in which the component is composed of one or more reverse-biased diodes (in the case of FIG. 1A, reverse-biased diode 134A), in series with zero or more forward-biased diodes (in the case of FIG. 1A, two forward-biased diodes 138A and 138B) coupled between the output terminal OUT and a low voltage node such as, for example, a grounded node.

In addition, a current mirror is coupled to the variable resistance component 131A to proportionately mirror the current passing through the variable resistance component 131A to generate a mirror current. Proportionate mirroring means that the current mirror is configured such that the generated mirror current tracks, in either equal proportion or some other proportion, the current through the variable resistance component 131A. In the illustrated embodiment of FIG. 1A, the current mirror includes MOSFETs 135A and 136A, although bipolar transistors may also be used.

The mirrored current is compared by a current comparator 133A to a reference current $I_{REF}$ provided by current source 137A. The current comparator 133A provides one digital value representing an enable signal to the enable terminal ENABLE of the open loop DC-to-DC converter circuit 110A if the reference current $I_{REF}$ is greater than the mirror current, and provides the opposite digital value representing a disable signal to the enable terminal ENABLE of the open loop DC-to-DC converter circuit 110A if the mirror current $I_{REF}$ is less than the mirror current. The current mirror and the reference current are sized, and the variable resistance component is designed such that the mirror current and the reference current $I_{REF}$ are approximately equal when the voltage at the output terminal OUT is at the design high voltage level. Accordingly, the digital feedback system 130A turns off the open loop DC-to-DC converter circuit 110A when the output voltage $V_{out}$ is too high, and turns on the open loop DC-to-DC converter circuit 110A when the output voltage $V_{out}$ is too low.

FIG. 1B shows a second embodiment of a closed loop DC-to-DC converter circuit 100B operating using analog feedback. In the analog case, the open loop DC-to-DC converter circuit 110B has an analog input terminal, rather than the digital enable terminal as described with respect to FIG. 1A. This allows the DC-to-DC converter circuit 110B to be controlled in a more continuous fashion for possible improved accuracy. The output capacitor 120B may, but need not, be structured as described above for the output capacitor 220 of FIG. 2. In the second embodiment, the feedback system 130B is an analog feedback system 130B.

As the output voltage $V_{out}$ rises to and above the desired high voltage level, the current through the voltage-controlled inverse-resistance component 131B (represented by the diode stack of diodes 139B, 138B, and 134B) will increase dramatically if the diodes 139B, 138B and 134B are designed in the same manner as are diodes 139A, 138A and 134A of FIG. 1A. Accordingly, the mirror current provided by the current mirror (represented here with MOSFETs 135B and 136B) and provided to the analog input terminal of the open loop DC-to-DC converter circuit 1101B will likewise increase dramatically at this control point.

As an example, if the open loop DC-to-DC converter 110B were a voltage multiplier, such as a charge pump, then the current signal from the current mirror could control the frequency of the clock driving the charge pump. In standard charge pump designs, a faster clock will increase the available output power. Thus, the analog signal provided at the analog input may increase or decrease the speed of the clock as appropriate to increase or decrease the output voltage $V_{out}$.

FIGS. 1A and 1B each show a variable resistance component in the form of a diode stack of one reverse-biased diode and two forward-biased diodes. As mentioned previously, however, any component that has the features attributable above to such a variable resistance component will suffice. For instance, if the variable resistance component is a diode stack, any number of combinations of forward and reverse biased diodes may be used to set the voltage at which current will dramatically increase through the current mirror. In standard CMOS technologies, diode-connected MOSFETs may be used. The reverse-biased breakdown of a long channel MOSFET is an avalanche breakdown typically greater than 1.5 times the standard supply voltage of the process. Furthermore, the reverse biased breakdown of a long channel devise has a slightly positive temperature coefficient. Conversely, the forward turn on voltage of a diode-connected MOSFET is related to the threshold voltage of the MOSFET and has a negative voltage coefficient. The combination of the two can be used to adjust the output voltage and the temperature coefficient of the DC-to-DC converter as needed. The output voltage and temperature coefficient may not be adjusted completely independently. However, several combinations of diodes within a standard CMOS process can be used to yield several options of output voltage and temperature coefficient. These diodes may include standard PN junction diodes with tunneling and or avalanche breakdown mechanism, forward biased PN junctions and Schottky diodes.

This feedback system has the advantage of not drawing significant current from the DC-to-DC converter until the desired output voltage is reached. Furthermore, if the diodes are chosen so that impedance after breakdown of the diode stack is low compared to the output impedance of the DC-to-DC converter, the diode stack will protect the load from spikes often generated by DC-to-DC converters. Lastly, no reference voltage is needed to support the feedback system, thereby potentially preserving layout area on the chip.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A closed loop DC-to-DC converter circuit comprising the following:
    an open loop DC-to-DC converter circuit configured to provide charge on its output terminal;
    a voltage-controlled inverse-resistance component coupled between the output terminal of the open loop DC-to-DC converter circuit and a low voltage node; and
    a feedback system that is configured to provide a signal to a control terminal of the open loop DC-to-DC converter circuit that is dependent on the current provided through the voltage-controlled inverse-resistance component.

2. A closed loop DC-to-DC converter circuit in accordance with claim 1, wherein the voltage-controlled inverse-resistance component comprises a reverse-biased diode coupled between the output terminal of the open loop DC-to-DC converter circuit and the low voltage node.

3. A closed loop DC-to-DC converter circuit in accordance with claim 1, wherein the signal provided by the feedback system causes the open loop DC-to-DC converter circuit to generate more current on the output terminal when there is less current passing through the voltage-controlled inverse-resistance component, and less or no current on the output terminal when there is more current passing through the voltage-controlled inverse-resistance component.

4. A closed loop DC-to-DC converter circuit in accordance with claim 1, wherein the control terminal is an enable terminal, and the feedback system comprises the following:
    a current mirror coupled to the reverse-biased diode so as to proportionately mirror the current passing through the voltage-controlled inverse-resistance component to generate a mirror current;
    a current source configured to provide a current; and
    a current comparator configured to generate a voltage representing a binary high to the enable terminal if the current provided by the current source is greater than the mirror current, and configured to generate a voltage representing a binary low to the enable terminal if the mirror current is greater than the current provided by the current source.

5. A closed loop DC-to-DC converter circuit in accordance with claim 1, wherein the control terminal is an analog input terminal, and the feedback system comprises the following:
    a current mirror coupled to the voltage-controlled inverse-resistance component so as to proportionately mirror the current passing through the voltage-controlled inverse-resistance component to generate a mirror current that is drawn from the analog input terminal.

6. A closed loop DC-to-DC converter circuit in accordance with claim 2, wherein the voltage-controlled inverse-resistance component further comprises the following:
    at least a first forward-biased diode coupled in series with the reverse-biased diode between the output terminal of the open loop DC-to-DC converter circuit and the low voltage node.

7. A closed loop DC-to-DC converter circuit in accordance with claim 6, wherein the voltage-controlled inverse-resistance component further comprises:
    at least a second forward-biased diode coupled in series with the first forward-biased diode and the reverse-biased diode between the output terminal of the open.

8. A closed loop DC-to-DC converter circuit in accordance with claim 7, wherein each of the reverse-biased diode, and the first and second forward-biased diode are Metal-Oxide Semiconductor devices.

9. A closed loop DC-to-DC converter circuit in accordance with claim 7, wherein the at least a second forward-biased diode comprises one or more additional forward-biased diodes in addition to the second forward-biased diode.

10. A closed loop DC-to-DC converter circuit in accordance with claim 6, wherein the at least the first forward-biased diode is a diode-connected Metal-Oxide-Semiconductor Field Effect Transistor (MOSFET).

11. A closed loop DC-to-DC converter circuit in accordance with claim 6, wherein the breakdown voltage of the reversed-biased diode has a positive temperature coefficient, and the forward turn on voltage of the first forward-biased diode has a negative temperature coefficient.

12. A closed loop DC-to-DC converter circuit in accordance with claim 11, wherein the reverse-biased diode is a Metal-Oxide Semiconductor device.

13. A closed loop DC-to-DC converter circuit in accordance with claim 12, wherein the forward-biased diode is a diode-connected Metal-Oxide-Semiconductor Field Effect Transistor (MOSFET).

14. A closed loop DC-to-DC converter circuit in accordance with claim 11, wherein the forward-biased diode is a diode-connected Metal-Oxide-Semiconductor Field Effect Transistor (MOSFET).

15. A closed loop DC-to-DC converter circuit in accordance with claim 1, wherein the control terminal is an enable terminal, and the feedback system provides digital feedback to the enable terminal.

16. A closed loop DC-to-DC converter circuit in accordance with claim 1, wherein the control terminal is an analog input terminal, and the feedback system provides analog feedback to the enable terminal.

17. A closed loop DC-to-DC converter circuit in accordance with claim 1, further comprising:
an output capacitor.

18. A closed loop DC-to-DC converter circuit in accordance with claim 1, wherein the open loop DC-to-DC converter circuit is a voltage multiplier, such as a charge pump.

19. A closed loop DC-to-DC converter circuit comprising the following:
an open loop DC-to-DC converter circuit configured to provide charge on its output terminal;
a voltage-controlled inverse-resistance component coupled in reverse-biased configuration between the output terminal of the open loop DC-to-DC converter circuit and a low voltage node; and
a digital feedback system that is configured to provide a signal representing one binary state if the current passing through the voltage-controlled inverse-resistance component is greater than a threshold value, and representing the opposite binary state if the current passing through the voltage-controlled inverse-resistance component is less than the threshold value.

20. A closed loop DC-to-DC converter circuit in accordance with claim 19, wherein the open loop DC-to-DC converter circuit is a voltage multiplier, such as a charge pump.

21. A closed loop DC-to-DC converter circuit comprising the following:
an open loop DC-to-DC converter circuit configured to provide charge on its output terminal;
a voltage-controlled inverse-resistance component coupled in reverse-biased configuration between the output terminal of the open loop DC-to-DC converter circuit and a low voltage node; and
an analog feedback system that is configured to provide an analog signal to an analog input terminal of the open loop DC-to-DC converter circuit that is a function of the current passing through the voltage-controlled inverse-resistance component.

22. A closed loop DC-to-DC converter circuit in accordance with claim 21, wherein the open loop DC-to-DC converter circuit is a voltage multiplier, such as a charge pump.

* * * * *

UNITED STATES PATENT AND TRADEMARK OFFICE
CERTIFICATE OF CORRECTION

| | | |
|---|---|---|
| PATENT NO. | : 7,106,039 B1 | Page 1 of 1 |
| APPLICATION NO. | : 11/119452 | |
| DATED | : September 12, 2006 | |
| INVENTOR(S) | : Scott et al. | |

It is certified that error appears in the above-identified patent and that said Letters Patent is hereby corrected as shown below:

Column 2
Line 7, change "places" to --place--
Line 17, change "reduced" to --reduces--

Column 3
Line 60, change "illustrated" to --illustrate--

Column 5
Line 12, change "1101B" to --110B--

Signed and Sealed this

Twenty-sixth Day of June, 2007

JON W. DUDAS
*Director of the United States Patent and Trademark Office*